US008438395B2

(12) United States Patent
Andelin et al.

(10) Patent No.: US 8,438,395 B2
(45) Date of Patent: May 7, 2013

(54) DIGITALLY WATERMARKING DOCUMENTS ASSOCIATED WITH VEHICLES

(75) Inventors: Victor L. Andelin, Kendallville, IN (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 2488 days.

(21) Appl. No.: 10/666,929

(22) Filed: Sep. 18, 2003

(65) Prior Publication Data

US 2005/0065886 A1    Mar. 24, 2005

(51) Int. Cl.
*H04L 29/06*    (2006.01)
(52) U.S. Cl.
USPC .......................................... 713/176; 713/170
(58) Field of Classification Search .................. 713/170, 713/176
See application file for complete search history.

(56) References Cited

U.S. PATENT DOCUMENTS

| | | | |
|---|---|---|---|
| 4,001,822 A * | 1/1977 | Sterzer | 342/44 |
| 4,972,476 A | 11/1990 | Nathans | |
| 5,113,445 A | 5/1992 | Wang | |
| 5,321,751 A | 6/1994 | Ray et al. | |
| 5,329,108 A | 7/1994 | Lamoure | |
| 5,337,361 A | 8/1994 | Wang et al. | |
| 5,351,302 A * | 9/1994 | Leighton et al. | 380/30 |
| 5,355,161 A | 10/1994 | Bird et al. | |
| 5,384,846 A | 1/1995 | Berson et al. | |
| 5,436,970 A | 7/1995 | Ray et al. | |
| 5,505,494 A | 4/1996 | Belluci et al. | |
| 5,568,406 A * | 10/1996 | Gerber | 702/159 |
| 5,646,997 A | 7/1997 | Barton | |
| 5,668,874 A * | 9/1997 | Kristol et al. | 713/186 |
| 5,719,939 A | 2/1998 | Tel | |
| 5,721,788 A | 2/1998 | Powell et al. | |
| 5,768,426 A | 6/1998 | Rhoads | |
| 5,787,186 A | 7/1998 | Schroeder | |
| 5,838,814 A * | 11/1998 | Moore | 382/115 |
| 5,841,886 A * | 11/1998 | Rhoads | 382/115 |
| 5,859,920 A | 1/1999 | Daly et al. | |
| 5,862,260 A | 1/1999 | Rhoads | |
| 5,864,623 A | 1/1999 | Messina et al. | |

(Continued)

FOREIGN PATENT DOCUMENTS

WO    WO 03/005291    1/2003

OTHER PUBLICATIONS

Szepanski, "A Signal Theoretic Method for Creating Forgery-Proof Documents for Automatic Verification," Proceedings 1979 Carnahan Conference on Crime Countermeasures, May 16, 1979, pp. 101-109.

*Primary Examiner* — David Garcia Cervetti
(74) *Attorney, Agent, or Firm* — Digimarc Corporation

(57) ABSTRACT

The present invention provides steganographically embedded auxiliary data in motor vehicle documentation. The auxiliary data is used to authenticate the documentation or provide additional or redundant information pertaining to the documentation. Examples of such documentation are license plates, vehicle titles, insurance cards, registration cards and emissions documentation. In one implementation of the invention, a title document is digitally watermarked for authentication. The digital watermark may include a digital signature related to a buyer and a digital signature related to a seller. In another implementation, the transfer of motor vehicles is facilitated via digital watermarking. In still another implementation, a document includes two or more digital watermarks. The digital watermarks are intertwined with each other and at least one of the watermarks is intertwined with the document.

21 Claims, 2 Drawing Sheets

U.S. PATENT DOCUMENTS

| | | | |
|---|---|---|---|
| 5,912,974 A * | 6/1999 | Holloway et al. ............... 380/51 |
| 5,943,422 A | 8/1999 | Van Wie et al. |
| 5,974,150 A * | 10/1999 | Kaish et al. .................... 713/179 |
| 6,024,287 A | 2/2000 | Takai et al. |
| 6,064,764 A | 5/2000 | Bhaskaran et al. |
| 6,076,064 A * | 6/2000 | Rose, Jr. ........................ 705/28 |
| 6,085,976 A * | 7/2000 | Sehr ............................... 235/384 |
| 6,089,452 A * | 7/2000 | Rhode, III ..................... 235/380 |
| 6,122,403 A | 9/2000 | Rhoads |
| 6,226,387 B1 | 5/2001 | Twefik et al. |
| 6,243,480 B1 | 6/2001 | Zhao et al. |
| 6,292,092 B1 | 9/2001 | Chow et al. |
| 6,328,209 B1 | 12/2001 | O'Boyle |
| 6,350,036 B1 * | 2/2002 | Hannington et al. ......... 359/541 |
| 6,367,182 B1 * | 4/2002 | Olson, Jr. ........................ 40/593 |
| 6,381,341 B1 * | 4/2002 | Rhoads .......................... 382/100 |
| 6,386,451 B1 * | 5/2002 | Sehr ............................... 235/384 |
| 6,389,151 B1 * | 5/2002 | Carr et al. ...................... 382/100 |
| 6,433,706 B1 | 8/2002 | Anderson, III et al. |
| 6,449,377 B1 | 9/2002 | Rhoads |
| 6,487,301 B1 | 11/2002 | Zhao |
| 6,500,526 B1 * | 12/2002 | Hannington ............... 428/195.1 |
| 6,546,112 B1 | 4/2003 | Rhoads |
| 6,558,009 B2 * | 5/2003 | Hannington et al. ......... 359/534 |
| 6,565,000 B2 * | 5/2003 | Sehr ............................... 235/384 |
| 6,608,911 B2 | 8/2003 | Lofgren et al. |
| 6,609,658 B1 * | 8/2003 | Sehr ............................... 235/384 |
| 6,609,659 B2 * | 8/2003 | Sehr ............................... 235/384 |
| 6,614,914 B1 | 9/2003 | Rhoads et al. |
| 6,632,533 B2 * | 10/2003 | Curiel ........................... 428/411.1 |
| 6,641,270 B2 * | 11/2003 | Hannington et al. ......... 359/536 |
| 6,683,966 B1 | 1/2004 | Tian et al. |
| 6,748,533 B1 * | 6/2004 | Wu et al. ....................... 713/176 |
| 6,751,336 B2 | 6/2004 | Zhao |
| 6,764,571 B2 * | 7/2004 | Curiel ........................... 156/289 |
| 6,775,394 B2 * | 8/2004 | Yu .................................. 382/100 |
| 6,796,489 B2 * | 9/2004 | Slater et al. ................... 235/379 |
| 6,837,960 B2 * | 1/2005 | Curiel ........................... 156/289 |
| 6,843,422 B2 | 1/2005 | Bi |
| 6,869,023 B2 | 3/2005 | Hawes |
| 6,871,789 B2 * | 3/2005 | Hilton et al. .................. 235/494 |
| 6,907,528 B1 * | 6/2005 | Bunn ............................. 713/179 |
| 6,910,628 B1 * | 6/2005 | Sehr ............................... 235/384 |
| 6,926,203 B1 * | 8/2005 | Sehr ............................... 235/492 |
| 6,970,573 B2 | 11/2005 | Carr et al. |
| 6,973,197 B2 | 12/2005 | Miller |
| 6,982,654 B2 | 1/2006 | Rau et al. |
| 7,016,516 B2 | 3/2006 | Rhoads |
| 7,039,214 B2 | 5/2006 | Miller et al. |
| 7,050,201 B2 | 5/2006 | Alattar |
| 7,051,086 B2 | 5/2006 | Rhoads et al. |
| 7,065,228 B2 | 6/2006 | Brundage |
| 7,069,252 B2 * | 6/2006 | Ishimi et al. .................. 705/76 |
| 7,069,443 B2 * | 6/2006 | Berringer et al. ............. 713/180 |
| 7,076,083 B2 * | 7/2006 | Blazey .......................... 382/100 |
| 7,108,178 B1 | 9/2006 | Choi |
| 7,126,457 B1 | 10/2006 | Van Schalkwyk Fourie |
| 7,127,406 B2 * | 10/2006 | Triola .......................... 705/26.41 |
| 7,130,087 B2 | 10/2006 | Rhoads |
| 7,143,950 B2 | 12/2006 | Bloomberg |
| 7,152,047 B1 * | 12/2006 | Nagel ............................ 705/76 |
| 7,152,786 B2 | 12/2006 | Brundage et al. |
| 7,155,409 B1 * | 12/2006 | Stroh ............................. 705/37 |
| 7,159,116 B2 * | 1/2007 | Moskowitz ................... 713/176 |
| 7,181,042 B2 | 2/2007 | Tian |
| 7,213,757 B2 | 5/2007 | Reed |
| 7,225,977 B2 | 6/2007 | Davis |
| 7,239,734 B2 | 7/2007 | Alattar et al. |
| 7,266,217 B2 | 9/2007 | Rhoads et al. |
| 7,269,734 B1 | 9/2007 | Johnson et al. |
| 7,281,666 B2 | 10/2007 | Smith |
| 7,305,104 B2 | 12/2007 | Carr et al. |
| 7,305,117 B2 | 12/2007 | Davis et al. |
| 7,314,162 B2 | 1/2008 | Carr et al. |
| 7,389,420 B2 | 6/2008 | Tian |
| 7,389,939 B2 | 6/2008 | Jones et al. |
| 7,412,055 B2 * | 8/2008 | Garay et al. ................... 380/30 |
| 7,580,988 B2 * | 8/2009 | Rudd ............................. 709/217 |
| 7,593,545 B2 | 9/2009 | Powell et al. |
| 7,770,013 B2 | 8/2010 | Rhoads et al. |
| 7,806,322 B2 | 10/2010 | Brundage et al. |
| 7,974,436 B2 | 7/2011 | Brunk et al. |
| 2001/0010730 A1 * | 8/2001 | Rhoads .......................... 382/100 |
| 2001/0016838 A1 * | 8/2001 | Landrock ...................... 705/80 |
| 2001/0018128 A1 * | 8/2001 | Hannington et al. ......... 428/439 |
| 2001/0047328 A1 * | 11/2001 | Triola ............................ 705/39 |
| 2002/0009208 A1 | 1/2002 | Alattar et al. |
| 2002/0010684 A1 * | 1/2002 | Moskowitz .................... 705/75 |
| 2002/0046171 A1 * | 4/2002 | Hoshino ........................ 705/43 |
| 2002/0052835 A1 * | 5/2002 | Toscano ........................ 705/38 |
| 2002/0069179 A1 * | 6/2002 | Slater et al. ................... 705/67 |
| 2002/0073010 A1 * | 6/2002 | Tresser et al. ................. 705/37 |
| 2002/0082984 A1 * | 6/2002 | Zappier ......................... 705/38 |
| 2002/0100802 A1 * | 8/2002 | Sehr ............................... 235/384 |
| 2002/0100803 A1 * | 8/2002 | Sehr ............................... 235/384 |
| 2002/0112816 A1 * | 8/2002 | Curiel ........................... 156/277 |
| 2002/0114491 A1 | 8/2002 | Sharma |
| 2002/0126872 A1 | 9/2002 | Brunk et al. |
| 2002/0152173 A1 * | 10/2002 | Rudd ............................. 705/57 |
| 2002/0178363 A1 | 11/2002 | Ambrogio et al. |
| 2003/0025423 A1 | 2/2003 | Miller |
| 2003/0033530 A1 | 2/2003 | Sharma et al. |
| 2003/0095688 A1 | 5/2003 | Kirmuss |
| 2003/0140011 A1 * | 7/2003 | Ishimi et al. .................. 705/76 |
| 2003/0150922 A1 | 8/2003 | Hawes |
| 2003/0151815 A1 * | 8/2003 | Hannington et al. ......... 359/536 |
| 2003/0174857 A1 * | 9/2003 | Yu .................................. 382/100 |
| 2003/0187756 A1 * | 10/2003 | Klivington et al. ............. 705/27 |
| 2003/0193182 A1 * | 10/2003 | Curiel ............................ 283/72 |
| 2004/0005463 A1 * | 1/2004 | Curiel ........................... 428/411.1 |
| 2004/0049401 A1 | 3/2004 | Carr et al. |
| 2004/0061327 A1 * | 4/2004 | Hilton et al. ................... 283/72 |
| 2004/0075869 A1 * | 4/2004 | Hilton et al. ................. 358/3.28 |
| 2004/0078333 A1 * | 4/2004 | Hilton et al. ................... 705/45 |
| 2004/0114779 A1 * | 6/2004 | Blazey .......................... 382/100 |
| 2004/0148248 A1 * | 7/2004 | Allen et al. .................... 705/37 |
| 2004/0181671 A1 | 9/2004 | Brundage et al. |
| 2004/0181756 A1 * | 9/2004 | Berringer et al. ............. 715/530 |
| 2004/0218785 A1 | 11/2004 | Kim |
| 2005/0018847 A1 * | 1/2005 | Garay et al. ................... 380/255 |
| 2005/0021970 A1 * | 1/2005 | Reese et al. ................... 713/176 |
| 2005/0271246 A1 | 12/2005 | Sharma et al. |

* cited by examiner

DIGITALLY WATERMARKING DOCUMENTS ASSOCIATED WITH VEHICLES

FIELD OF THE INVENTION

The present invention relates generally to methods and systems for steganographically embedding data. A preferred form of steganography is digital watermarking. More particularly, the present invention relates to steganographically embedding data in vehicle-related documentation.

BACKGROUND AND SUMMARY OF THE INVENTION

A mountain of documents are associated with vehicles: registration documents, insurance cards, cab cards, disabled placards, tags (or stickers), state or county inspection certification, emissions documentation, license plates, trip permits, cargo manifests, and title documents, to name but a few.

Counterfeiters and forgers busy themselves by altering or faking such documents. It is becoming difficult to verify the authenticity of such documents and cumbersome to find additional information related to them.

One solution is to embed steganographic auxiliary data in vehicle-related documents to help prevent or detect counterfeiting. The data can be decoded to determine whether the object is authentic. The auxiliary data may provide a link to a network resource, such as a web site or data repository.

One form of steganography is digital watermarking. Digital watermarking systems typically have two primary components: an encoder that embeds the watermark in a host media signal, and a decoder (or reader) that detects and reads the embedded watermark from a signal suspected of containing a watermark. The encoder can embed a watermark by altering the host media signal. The decoding component analyzes a suspect signal to detect whether a watermark is present. In applications where the watermark encodes information, the decoder extracts this information from the detected watermark. Data can be communicated to a decoder, e.g., from an optical sensor (e.g., a web camera, digital camera, scanner, etc.).

A watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

The physical manifestation of watermarked information most commonly takes the form of altered signal values, such as slightly changed pixel values, picture luminance, picture colors, DCT ("Discrete Cosine Transform") coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms or embedded in conventional paper watermarks.

If a document includes an image, photograph, graphic, line art or artwork, these features may be subtly altered to embed a watermark.

Some techniques for embedding and detecting watermarks in media signals are detailed in the assignee's U.S. Pat. Nos. 6,122,403, 6,449,377 and 6,614,914, and PCT patent application PCT/US02/20832 (published as WO 03/005291), which are each herein incorporated by reference.

In the following disclosure it should be understood that references to watermarking and steganographic data hiding encompass not only the assignee's technology, but can likewise be practiced with other steganographic technologies as well.

According to one aspect of the present invention, a license plate for attachment to a motor vehicle is provided. The license plate includes auxiliary data steganographically embedded therein.

Another aspect of the present invention provides a method of providing authenticating information for a property title document. The method includes steps of: i) receiving a first digital signature that is associated with a seller of property; ii) receiving a second digital signature that is associated with a buyer of the property; iii) using the first digital signature and the second digital signature to provide a digital watermark payload, the payload comprising the authenticating information; and iv) steganographically embedding the digital watermark payload in the property title document.

Yet another aspect of the present invention is a method to authenticate documentation associated with a motor vehicle. The documentation includes plural-bit auxiliary data steganographically embedded therein. The auxiliary data includes at least an identifier. The method includes: receiving optically captured image data that corresponds to the documentation; analyzing the image data to obtain the identifier, wherein the identifier includes or links to information to uniquely identify the motor vehicle; and providing a signal in response to the identifier being successfully obtained.

Still another aspect of the present invention is a method to facilitate transfer of a motor vehicle from a seller to a buyer. The method includes steps of: i) receiving into a first data record information associated with the motor vehicle or the seller of the motor vehicle; ii) providing the buyer of the motor vehicle with a digitally watermarked object, the digital watermark comprising an identifier; iii) associating the identifier with a second data record, the second data record including information associated with the buyer of the motor vehicle; iv) associating the first data record with the second data record; and v) upon presentment of the digitally watermarked object, optically capturing scan data representing the digitally watermarked object, and analyzing the scan data to obtain the identifier, said method further comprising accessing at least the second data record via the identifier.

The foregoing and other features, aspects and advantages of the present invention will be even more readily apparent from the following detailed description, which proceeds with reference to the accompanying drawings.

DETAILED DESCRIPTION

Introduction

Figure 1:
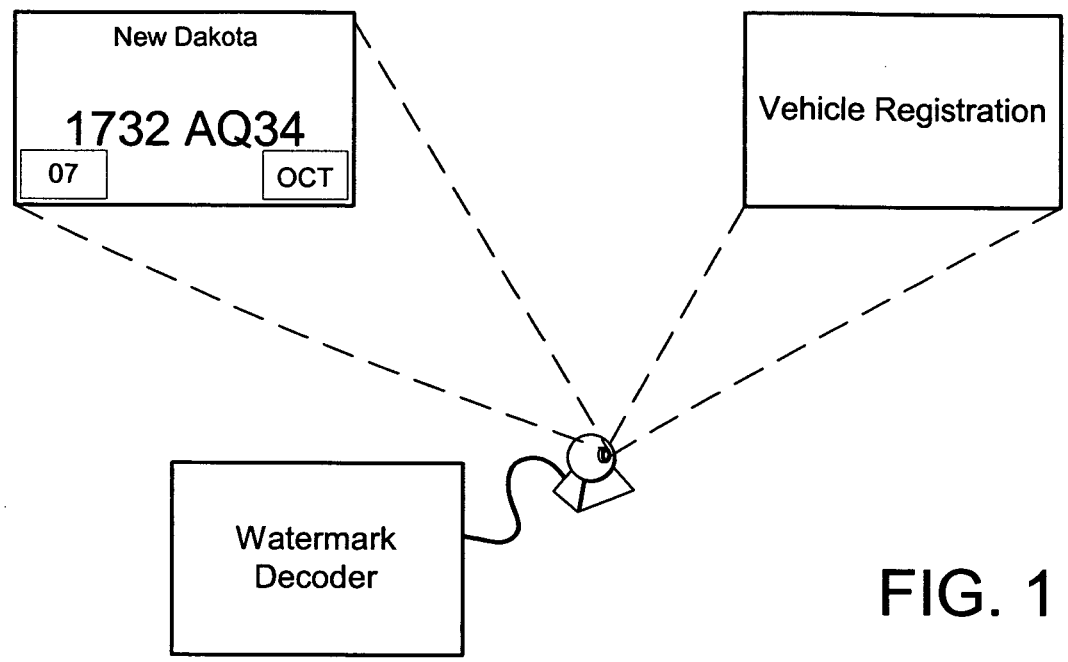
FIG. 1 is a diagram demonstrating an authentication process for documents intertwined through digital watermarking.

The following discussion provides methods and systems for watermarking documents that are associated with vehicles. A preferred from of steganography is digital watermarking. Watermarks in the same or different documents can be intertwined or otherwise associated with each other and/or with other documentation (e.g., like an authorized driver's license). A digital watermark can also be used to link to related information, such as a Division of Motor Vehicle (DMV) database, law-enforcement database, and to assist in the renewal of a vehicle document. A digital watermark can also be used to facilitate transfer of vehicle titles and to authenticate such titles.

Watermarking Vehicle-Related Documents

Numerous documents are associated with vehicles (e.g., cars, trucks, buses, motor homes, boats, recreational vehicles, motorcycles, trailers, off-road vehicles like four-wheelers and tractors, aircraft, etc.). Such documents may include, e.g., registration documents, insurance cards, cab cards, disabled placards, tags (or stickers), state or county inspection certification, emissions documentation, trip permits, cargo manifests, flight plans, license plates and title documents, etc.

We preferably provide steganographically embedded auxiliary data for vehicle-related documentation.

The auxiliary data can be represented in many different forms. In a simplified implementation the auxiliary data includes plural-bit data. In another implementation the auxiliary data includes multiple fields as shown in the below Table 1: Auxiliary Data Format. For example, consider a vehicle registration document where auxiliary data includes a first field to identify the corresponding vehicle (perhaps by a vehicle identification number (VIN) or a hash or reduced-bit representation of a VIN), a second field to identify the issuing body (e.g., the Indiana DMV), a third field to indicate a valid through date, issue date and/or expiration date and a fourth field to identify intertwined information (e.g., an identifier to identify a data record or information corresponding to a second, related document like a driver's license or state employee number). Of course, the auxiliary data can include more or less fields according to document application. Additional (or alternative) fields may include, e.g., vehicle type (make, model, year, etc.), vehicle color, corresponding vehicle license plate number, owner name, government identifier (e.g., an indicator showing whether the vehicle is registered to a government agency), vehicle use restrictions, document identifier, etc. The use of the term "field" should not be limited to separate components. Instead, a field may also include designated bits within a payload string (e.g., bits 0-15=field 1; bits 16-23=field 2; and so on).

TABLE 1

Auxiliary Data Format

| VIN | Issuing Body | Date | Information |
| --- | --- | --- | --- |

In another implementation the auxiliary data includes a plural-bit identifier. The identifier, once decoded from a vehicle-related document, is used to interrogate a data record. While an embedded identifier remains static, the data record is updateable—providing a dynamic identifying mechanism. The data record can include information associated with or related to the document. For example, the data record may include the document type, vehicle type (make, model, year, etc.), vehicle color, corresponding vehicle license plate number, owner name, government identifier (e.g., an indicator showing whether the vehicle is registered to a government agency), vehicle use restrictions, document identifier, cross-correlating information, authorized drivers of a related vehicle, etc.

Once encoded with auxiliary information, vehicle-related documents can be used in a number of helpful applications. Consider the following examples.

Intertwining Watermarks for Authentication and Security

Two or more vehicle-related documents are intertwined, or associated, to provide additional information and security.

Consider an example including a license plate and a driver's license. A driver is issued a driver's license which includes first auxiliary data steganographically embedded therein. In a preferred implementation the steganographic embedding comprises a digital watermark.

The driver then obtains plates for her car. The plates preferably include second auxiliary data steganographically embedded therein. The steganographic embedding may take many forms, e.g., embedding graphics or images printed on the plate, subtle printing or engraving of a background tint or pattern, an ultraviolet or infrared layer, surface topology of the plate, etc.

The second auxiliary data relates to, or is redundant with, the first auxiliary data. For example, the second auxiliary data includes a cryptographic permutation of the first auxiliary data, or includes a hash or a reduced-bit representation of the first auxiliary data. The first auxiliary data can be retrieved from a data record associated with the driver and used to generate the second auxiliary data; or, the first auxiliary data can be decoded from the driver's license and then used to generate the second auxiliary data.

The first and second auxiliary data are decoded and correlated to determine whether the license plate and driver's license relate in a predetermined manner. If the second auxiliary information includes a hash of the first auxiliary information, then the hash function is performed on the first auxiliary data to see if an expected hash is achieved. Or, if the second auxiliary data includes a cryptographic permutation of the first auxiliary data, the cryptographic relationship can be verified. The first and second auxiliary data may also include the same identifier. The identifiers can be compared to determine whether they match as expected. See, e.g., assignee's U.S. patent application Ser. No. 10/172,506, filed Jun. 14, 2002 for even more details about linking two or more documents. Each of these patent documents is herein incorporated by reference.

Now consider FIG. 1, where an optical sensor captures scan data corresponding to a digitally watermarked license plate (New Dakota) and scan data corresponding to a digitally watermarked vehicle registration document. The watermarks are intertwined, e.g., in a manner as discussed above. The scan data is provided to a watermark decoder, which searches the scan data to obtain the watermarks. The watermarks are compared to determine whether they are intertwined as expected.

To illustrate even further, a law enforcement officer optically scans a steganographically encoded license plate, e.g., with a handheld optical sensor or camera-equipped cell phone. The optical scan data is analyzed to detect and decode the steganographic encoding. The second auxiliary data is decoded from the license plate scan data. The officer also scans the driver's license to obtain the first auxiliary information. Matching software (or firmware) correlates the first and second auxiliary data, decoded from the steganographic encoding, to determine whether they correspond as expected.

Other documents can be intertwined via embedded auxiliary data as well. Consider, for example, a registration document and license plate that are linked via digital watermarks, or a license tag (or sticker) that is intertwined with its license plate (e.g., through watermarking a plate graphic or image, etc.), registration document, driver's license, cab card, disabled placards, etc. Insurance documents can be linked as well. Many combinations of intertwined vehicle documents are possible. Vehicle-related documents can also be associated with personal documents such as birth certificates and social security cards.

Instead of directly comparing the first and second information, the auxiliary information can be compared through a data record. The first data can be used to interrogate a database, and the database can include information for authentication of the two or more documents. The information may be redundant to, overlap with or be supplemental to that information which is printed on one or more of the documents.

Now consider a vehicle-related document, which includes two or more digital watermarks or which includes two or more digital watermark components. The two or more watermarks, each embedded in the same vehicle-related document (e.g., a title or registration card), can be intertwined or associated with each other. For example, if the watermarks include information that is elsewhere provided on the document (e.g., text, barcode information, data stored in memory, etc., which is also referred to as "other information"), the watermark information can be apportioned between, or can be redundantly placed in, the two or more watermarks. To verify the authenticity of the document, the two or more digital watermarks are decoded, the other information is obtained (perhaps through OCR or optical/magnetic sensing), and the watermark information is compared or correlated to the other information. The "other information" can also be redundantly provided in a remote data repository, which is accessed via a digital watermark identifier. The comparison or correlation of the watermark information can proceed with respect to the other information as stored in the data repository.

In a related implementation involving two or more watermarks per document, a first digital watermark includes a first payload including a document identifier. For example, if the document is a registration or title document, the identifier may correspond to or represent the registration number or title number. Or the payload may include an identifier that is associated with the document number through a data repository. The first digital watermark may even be printed during a document creation process, prior to personalization of the document, like during document stock creation. A second digital watermark is thereafter applied to the document, e.g., via printing or laser engraving. (See, e.g., assignee's U.S. patent application Ser. No. 10/172,769, filed Jun. 14, 2002 for even more details regarding printing watermarks in different printing stages. Each of these patent documents is herein incorporated by reference.) The second digital watermark preferably includes information that is personal or unique to a document holder or to variable information provided on the document (e.g., name, personal identifier, address, VIN, etc.). The second digital watermark can also include a representation of the document number like a registration number, VIN or title number. This way, the second digital watermark is intertwined with both the first digital watermark and the document itself (via the document number). The representation can take may different forms, including a redundant copy of the document number, a hash or reduced-bit representation of the document number, a cryptographic permutation of the document number and so on.

In a further related implementation involving two or more watermarks per document, a first digital watermark payload (e.g., 8-256 bit payload) is hashed or otherwise reduced in bit-size. The payload hash or reduced-bit representation is included as at least a part of a second digital watermark payload. The first and second watermarks are thus intertwined. To illustrate, say a first digital watermark payload includes a document identifier or other document data. The document identifier can be a number printed (VIN or title number) on the document or stored in a data repository. The other data can be, e.g., a bearer's name, date of birth or other document information. The document identifier is carried in the first digital watermark payload as, e.g., a 28-bit number. A hash of the 28-bit number is generated and used as at least a part of a second digital watermark payload. Any conventional hashing algorithm, which reduces the bit representation of the first payload, is acceptable. The second digital watermark may also include other information that is provided on or carried by the document, like a date of birth for the document bearer, bearer's initials, VIN number, car make/model, and/or bearer selected personal identification number (PIN). The second digital watermark includes, e.g., the hash and the other information in an, e.g., 30-bit payload. Either of the first or second watermarks may include random data in a few bits of known location, such that if the payloads are encrypted, the encrypted payload is dynamic and cannot be retroactively mapped to the document creator (e.g., a recipient, issuing authority, lot number, etc.).

To verify document authenticity, the two watermarks are decoded from the document, and the other information carried by the document is machine-sensed, e.g., perhaps through OCR, barcode reading or optical/magnetic sensing. The same (or corresponding) hash algorithm that was used to calculate the hash of the first payload and carried in the second payload ("carried hash") is again employed to calculate a hash of the first digital watermark payload ("new hash"). The new hash is compared with the carried hash to determine if they correspond as expected. If not, the document is considered suspect. The first payload can also be checked against the machine-sensed other information to determine whether the first watermark payload corresponds with the document. Similarly, the other information, if carried by the second digital watermark, can be compared to the corresponding other information as carried by the document. Thus, the digital watermarks are intertwined with each other and with the document.

Linking to Additional Information

Auxiliary data (e.g., an identifier), once decoded from a vehicle-related document, can be used to interrogate a database. The database preferably includes information related to the vehicle, documentation or affiliated drivers.

For example, during a routine traffic stop, a law enforcement officer optically scans a vehicle's license plate. Auxiliary data is detected and decoded from the optical scan data to obtain the identifier. The identifier is communicated to a database. In some cases, the database is local with respect to the scanning device (or officer's vehicle). In other cases the database is remotely accessed. The database may include information such as outstanding warrants or related tickets, expected owner, registration information, photographs of the owner and the like. In some cases the database includes a listing of authorized drivers for the vehicle, e.g., perhaps as submitted by the vehicle owner or an employer. Another measure to determine an authorized driver may be an "operator class" as is commonly required for some buses and trucks. The officer can compare this information to the driver or the driver's documentation (e.g., license). (This process can be automated, e.g., since the driver's license can also be inspected for a digital watermark payload including operator class, user restrictions, identifier, etc. The watermark payload can be matched against corresponding database information.).

A steganographically embedded identifier provides dynamic applications when associated to a corresponding data record. Consider a situation where a license plate is embedded to include an identifier. The identifier is associated with a database record (e.g., revealing the owner, vehicle information, etc.) The car is sold and the plates are left on the car. Instead of issuing new plates with a new identifier, the database record that is associated with the identifier is simply updated to reflect the transfer of ownership.

In a related implementation we embed a so-called RFID ("Radio Frequency Identification") tag or chip in a driver license and/or license plate. The RFID is detected and used for cross-correlation or linking as discussed above. The RFID can be embedded during driver license and/or plate manufacture. Indeed, many plate-manufacturing processes are trending toward plastic materials, which make RFID insertion even more feasible. The RFID identifier can be associated with other documents or through a database record. We note that an RFID chip may not always be suitable for other vehicle-related documents due to size, manufacture and cost constraints.

A digital watermark identifier can also be used in accident/crime reporting or for tollbooth payment. A bystander witnesses an accident. The bystander whips out her camera-equipped cell phone, captures an image of a watermarked license plate and sends the image (or a decoded digital watermark identifier) to a 911 center. The 911 center receives the image, decodes the steganographically embedded identifier and then responds to the accident or crime scene. A GPS ("Global Positioning System") device associated with the cell phone can be used to confirm an accident location. While this procedure can be manually performed through a recitation of the license plate number, the reporting accuracy skyrockets by relying on the machine-readable information. Similarly, tollbooths or automated speeding ticket cameras can capture images of cars as they speed by, decode a watermark identifier from an image of a digitally watermarked license plate, access the corresponding account or record with the identifier, and respond accordingly (e.g., debit an account associated with the car if a tollbooth or issue a speeding ticket to a corresponding driver if a ticketing camera).

Authentication

We provide a digital watermark component in some implementations to include so-called authentication information. The authentication information is used to verify the authenticity of the document. In some implementations the authentication information is redundant with or correlates to information provided elsewhere (or carried by a machine-readable features like a 2D-barcode, smart card memory and/or optical/magnetic memory) on the document. Consider an insurance card with a digital watermark embedded therein. The digital watermark includes information printed or carried elsewhere on the document ("other information"), like a policy number, driver license number and/or issuer's name. The authentication information is preferably redundant with, correlated to, a reduced-bit representation of, or supplemental to, the policy number, driver license number and/or issuer's name. The watermark information is decoded and compared to the other information, perhaps after OCR or optical/magnetic sensing of the other information. In this implementation, the watermark is intertwined with the other information.

In other implementations the very presence of the authentication information indicates an authentic document.

In still other implementations the authentication information includes a so-called fragile digital watermark component. A fragile watermark component is designed to predictably degrade when exposed to some types of signal processing, like scanning/printing as might be commonly employed in a counterfeiting scenario.

Title Documents

Title documents can be similarly protected and authenticated with digital watermarks.

Figure 2:
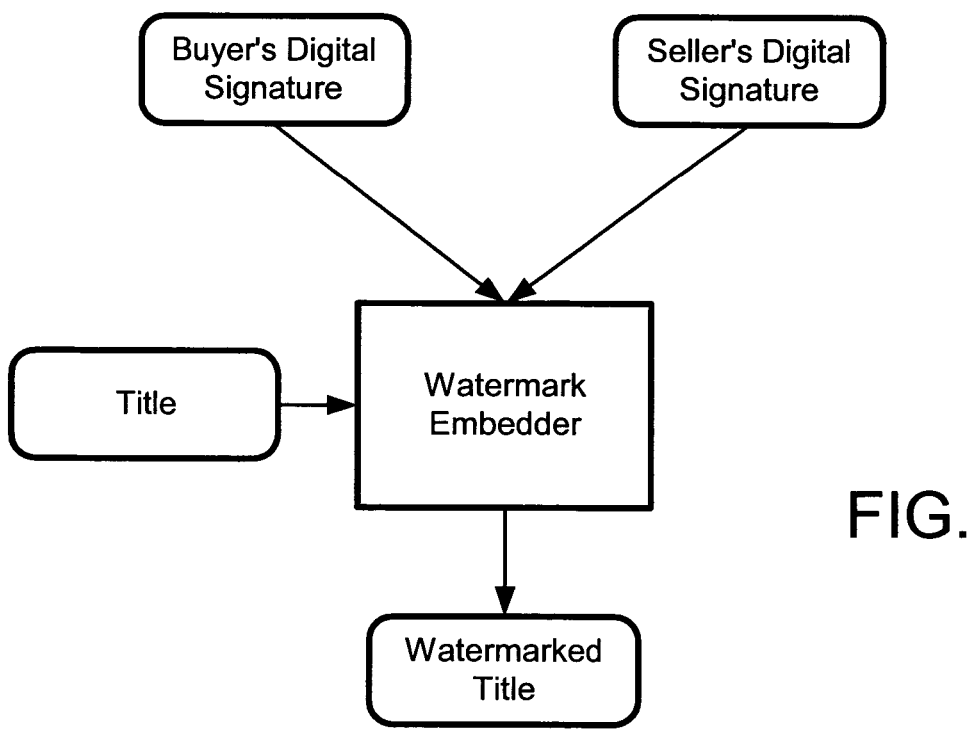
FIG. 2 is a diagram illustrating a watermark embedding process for title documents.

Consider the following scenario with reference to FIG. 2. A buy and seller agree to transfer title to a motor vehicle. The buyer and seller each provide a digital signature to uniquely identify themselves or their assent to (or participation in) the transfer. The term "digital signature" is broadly used in this document, and may include many different types of authentication measures. A requirement, however, is that a digital signature must represent or otherwise associated with a buyer or seller. In one implementation a digital signature is a cryptographic representation of an identifier associated with a buyer or seller. The identifier can be a driver's license number, a tax number, a dealership number, a social security number or a randomly assigned identifier. The digital signature may also include a time/date stamp (e.g., plural-bits of information indicating a date and/or time of the transaction.). The time/date stamp can be combined with the identifier, or with a cryptographic representation of the identifier, to form the digital signature. In other cases the digital signature is assigned to a user after, e.g., an online registration.

A watermark embedder uses the two digital signatures—one from the buyer and one from the seller—when constructing a watermark payload. For example, the digital signatures (or cryptographic permutations of such) can be embedded as watermark payload fields or as separate watermark components. In other implementations the two digital signatures are used as inputs for a mathematical function, the output of the function is provided as the watermark payload. The two signatures can be combined or hashed as well, and then used to construct the payload. The payload is steganographically embedded in a document that transfers title from the seller to the buyer. (The term "document" in this context refers to either electronic or physical documents.).

An embedded watermark can be decoded from a digital or analog version of the title document. The digital signatures are retrieved (or reconstructed) from a watermark payload to verify the authenticity of the document. Or, if a relationship between the two digital signatures is conveyed through the payload, the relationship is analyzed, perhaps with reference to the original digital signatures. To help with signature verification a database can be maintained to control or associate digital signatures with particular individuals.

In a related scenario a digital watermark includes information provided elsewhere on the document including information pertaining to both a buyer and seller.

An online version of this example proceeds as follows. A seller logs on to a web-based title holding site. The seller authenticates herself through a standard logon process (e.g., username and password) or through a digital watermarking logon process, where the seller must present a digitally watermarked document for inspection and verification. For example, the seller presents a watermarked card or document (perhaps even the original title itself) to an optical sensor like a web camera or scanner. The optical sensor produces scan data corresponding to the document, which includes the digital watermark. A digital watermark identifier is decoded and compared to an expected logon identifier in order to facilitate the logon or to access information related to the document.

Once online, the user is provided with a graphical user interface to enter information regarding the seller. (Alternatively, the buyer and seller are each provided with a transaction number which links to a data structure including information related to the transaction. Each of the buyer and seller enter their information, which is associated with the transaction number.). Title is transferred to the seller, perhaps including the digital signatures of the buyer and seller, or a watermarked version of the title as discussed above. (Electronic records of the title or transaction can include watermarks as well.).

Car Auctions

Figure 3:
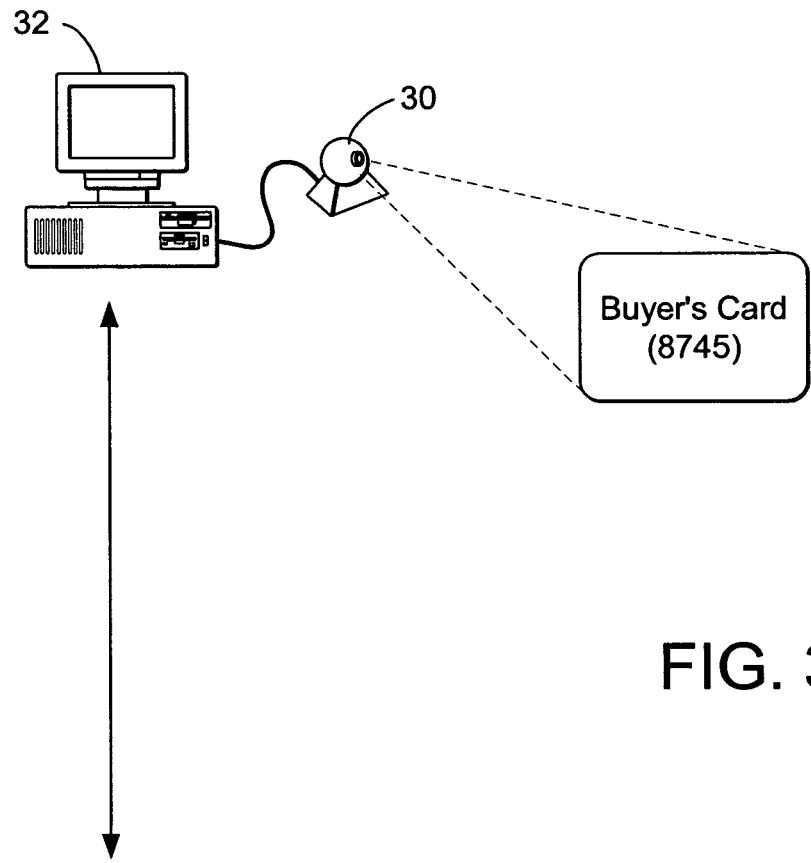
FIG. 3 is a diagram illustrating an interface and process to facilitate title transfer.

Now consider a situation where many titles are rapidly changing hands, like at a car auction. Watermarks are used to efficiently facilitate transaction—and transfer of title—of auctioned cars. A computerized interface 32 is provided (FIG. 3). The interface 32 cooperates with a database including data records for respective cars to be auctioned. For example, a seller provides a record including lemon-law disclosure, title information, tax number, social security number, VIN, etc., etc. The record is associated with a record number (or index, lot number, etc.).

Potential buyers are issued watermarked documents (or a "Buyer's Card," as shown in FIG. 3) having unique identifiers (e.g., "8745"). The identifiers are associated—perhaps through a database—to information regarding the buyers (e.g., name, dealer number, tax number, bank account or credit account, etc.). The database or a cooperating data repository can maintain the information.

The auction proceeds in a conventional manner. Along the way, however, the database is updated by, e.g., the auction organizers, to reflect winners of the auctioned cars (e.g., Lot 1, Lot 6, Lot 8, etc.). Or perhaps a separate record (34) is maintained to reflect which buyers won which auctioned cars. To finalize a transaction associated with an auctioned car, a buyer presents her watermarked document to an optical sensor. The optical sensor provides scan data to be analyzed by a watermark detector. The detector obtains the identifier from the decoded scan data and provides the identifier for use by the computerized interface 32. The computerized interface 32 accesses the seller's record or the record of transactions (34) via the identifier. (In a simplified implementation the identifier is used to interrogate a database for a data record or to index a Look-up-Table to retrieve the information. In more sophisticated implementations the identifier is used to direct the computer interface 32, or a browser associated with the interface, to a secure data repository to find the information.). An auctioned car can be associated with its seller's information via a lot number or a watermark identifier. Once found the seller disclosure materials (if required by law) or other seller/vehicle related information is preferably presented to the seller, and the seller is optionally prompted to confirm the transaction (e.g., "click here if you agree"). The seller's information from the data repository is matched with the buyer's successfully auctioned cars and the transaction is finalized. This checkout process may also include automatically debiting the buyer's account at checkout, automatically transferring funds or credit from one account to another, and/or automatically informing the DMV or county recording office of the transaction, if desired.

A vehicle title copy (or proof of purchase) can be printed at the completion of the checkout.

In summary, a buyer presents a watermarked document to an optical sensor to complete an auction transaction. The watermark links to purchaser information, and perhaps even seller information. Payment accounts can be automatically debited or credited based on the information. Any required documents, like title documents can be generated. A computer interface cooperates to seamlessly facilitate the transaction.

Concluding Remarks

To provide a comprehensive disclosure without unduly lengthening this specification, each of the above-identified patent documents is herein incorporated by reference.

Having described and illustrated the principles of the invention with reference to illustrative implementations and examples, it should be recognized that the invention is not so limited. The present invention finds application beyond such illustrative implementations and examples.

Other elements and techniques can similarly be combined to yield further implementations within the scope of the present invention. Thus, for example, single-bit watermarking can be substituted for plural-bit watermarking, local scaling of watermark energy can be provided to enhance watermark signal-to-noise ratio without increasing human perceptibility, watermarks can include subliminal graticules or orientation to aid in image re-registration or distortion compensation, encoding may proceed at the granularity of a single pixel (or DCT coefficient), or may similarly treat adjoining groups of pixels (or DCT coefficients), the encoding can be optimized to withstand expected forms of content corruption. Thus, the exemplary embodiments, implementations and examples disclosed herein are only selected samples of the solutions available in accordance with the present invention. The other solutions necessarily are not exhaustively described herein, but are fairly within the understanding of an artisan given the present disclosure and familiarity with the related art.

While "car auctions" have been used to illustrate one aspect of the invention, other aspects of the invention include auctions for other types of property as well. For example, an auction for other types of personal property (e.g., computers, livestock, cds, etc.) and/or real property (e.g., houses, real estate) will befit from the techniques discussed with reference to FIG. 3.

The implementation of some of the functionality described above (including watermark or steganographic encoding and decoding) can be implemented by suitable software, stored in memory for execution on an associated processor or processing circuitry. In other implementations, the functionality can be achieved by dedicated hardware, or by a combination of hardware and software. Reprogrammable logic, including FPGAs ("Field-programmable Gate Array"), can advantageously be employed in certain implementations.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

What is claimed is:

1. A method of providing authenticating information for a property title document, said method comprising:
receiving a first digital signature that is associated with a seller of property;
receiving a second digital signature that is associated with a buyer of the property;

using the first digital signature and the second digital signature to provide a digital watermark payload, the payload comprising authenticating information; and utilizing a configured multi-purpose electronic processor, steganographically embedding the digital watermark payload in the property title document.

2. The method of claim 1, wherein the authentication information comprises the first digital signature and the second digital signature.

3. The method of claim 1, wherein the authentication information comprises a cryptographic permutation of at least one of the first digital signature or the second digital signature.

4. The method of claim 1, wherein the authentication information comprises an output of a function which includes the first digital signature and the second digital signature as inputs.

5. The method of claim 1, wherein at least one of the authentication information, first digital signature or second digital signature comprises a time or date stamp.

6. The method of claim 1, wherein the property comprises at least one of a motor vehicle, personal property or real property.

7. The method of claim 1, wherein the authentication information comprises a reduced-bit representation of at least one of the first digital signature or the second digital signature.

8. The method of claim 1, wherein the property title document comprises at least one of an electronic document or a printed document.

9. A programmed computing device storing instructions in memory, said instructions are executable by said programmed computing device to perform the acts of claim 1.

10. A non-transitory computer readable media comprising instructions stored thereon to cause a multi-purpose electronic processor to perform the acts of claim 1.

11. A method to facilitate transfer of a motor vehicle from a seller to a buyer, said method comprising:

receiving into a first data record information associated with the motor vehicle or the seller of the motor vehicle;

providing the buyer of the motor vehicle with an object including a digital watermark, the digital watermark comprising an identifier;

associating the identifier with a second data record, the second data record including information associated with the buyer of the motor vehicle;

associating the first data record with the second data record;

upon presentment of the object including the digital watermark, receiving optically captured scan data representing the object including the digital watermark, and analyzing the scan data with a configured multi-purpose electronic processor to obtain the identifier, said method further comprising accessing at least the second data record via the identifier.

12. The method of claim 11, further comprising accessing the first data record.

13. The method of claim 12, wherein the first data record and the second data record are associated via the identifier.

14. The method of claim 12, further comprising presenting at least some of the information that is associated with the motor vehicle or the seller of the motor vehicle to the buyer through a computer interface.

15. The method of claim 14, further comprising prompting the buyer to confirm the transfer through the computer interface.

16. The method of claim 15, further comprising automatically notifying at least a government agency after the buyer confirms the transfer.

17. The method of claim 15, wherein the information associated with the buyer comprises an account number, said method further comprising automatically debiting the account after the buyer confirms the transfer.

18. The method of claim 17, further comprising generating a printed title document after the buyer confirms the transfer.

19. The method of claim 11, wherein the motor vehicle is purchased through an auction.

20. A programmed computing device storing instructions in memory, said instructions are executable by said programmed computing device to perform the acts of claim 11.

21. A non-transitory computer readable media comprising instructions stored thereon to cause a multi-purpose electronic processor to perform the act of analyzing recited in claim 1.

* * * * *